Oct. 15, 1940.   J. E. HAINES   2,217,680

AIR CONDITIONING SYSTEM

Filed Feb. 23, 1937

Inventor
John E. Haines
By George H. Fisher
Attorney

Patented Oct. 15, 1940

2,217,680

UNITED STATES PATENT OFFICE 2,217,680

AIR CONDITIONING SYSTEM

John E. Haines, Minneapolis, Minn., assignor to Minneapolis-Honeywell Regulator Company, Minneapolis, Minn., a corporation of Delaware Application February 23, 1937, Serial No. 127,129

27 Claims. (Cl. 257—3)

This invention relates generally to the art of air conditioning and is more particularly concerned with automatic control arrangements for air conditioning systems.

The primary object of my invention is to provide a relatively simple and dependable control arrangement for automatically controlling an air conditioning system to maintain the desired indoor conditions throughout the entire year, such system effecting control of cooling, control of heating, control of ventilation, control of humidification and control of dehumidification, these various conditioning functions being utilized in varying degrees and sequence to maintain the desired indoor conditions regardless of conditions exterior to the conditioned space.

In one form which my invention may take a cooling coil, a heating coil, and a spray device are located in a conditioning chamber, this conditioning chamber being connected by delivery and return ducts with a space to be conditioned. A by-pass is provided around the cooling coil, heating coil, and spray device, and face and by-pass dampers are provided for controlling the relative proportions of the air passed through and by-passed around the aforementioned conditioning devices. The face and by-pass dampers are controlled by a proportioning motor, this motor being controlled in accordance with the temperature and humidity within the conditioned space during the cooling cycle. These controlling devices cooperate to maintain a predetermined effective or comfort temperature within the conditioned space. In order to vary the temperature maintained within the space with variations in outdoor temperature, an outdoor temperature controller is provided, this controller acting to raise the control point of the indoor controllers as the outdoor temperature increases. The cooling coil forms part of a compression refrigeration system. In order to conserve on operating costs and place the compressor out of operation when no cooling action is needed, a switch is provided which is actuated by the damper control means, this switch being arranged to stop the compressor whenever the by-pass damper is moved to wide open position.

The supply of fresh air to the system is controlled during the cooling cycle by means of an outside temperature controller and during the heating cycle by means of an inside temperature controller, these controllers being arranged to shift the control of the fresh air damper from one controller to the other as the system automatically changes from cooling operation to heating and vice versa. These controllers are arranged to progressively cause closing of the fresh air damper as the cooling load increases or as the heating load increases, thereby providing a large supply of fresh air whenever but a small amount of conditioning is required therefor, and reducing the supply of fresh air as the need for conditioning increases.

During summer operation it sometimes happens that the humidity of the outside air becomes extremely excessive, while its temperature is relatively low this resulting in an increase in humidity within the enclosure. In order to prevent the humidity within the space from becoming excessive due to such outside conditions a humidity controller is provided which simultaneously acts to close the fresh air damper and to place the compressor in operation regardless of the temperature within the space. This feature forms one object of my invention.

During the heating cycle it is undesirable to permit operation of the cooling coil. At this time it is also undesirable to by-pass any air around the heating coil. I therefore provide means for preventing operation of the compressor and for closing the by-pass damper whenever the heating coil is placed in operation. This forms another object of my invention.

A further object of my invention is the provision of an air conditioning system with a fresh air damper controlling means which functions to vary the quantity of fresh air admitted in a manner to admit a maximum quantity of fresh air when the condition of such air is near the condition desired within the conditioned space, and which gradually restricts the admittance of fresh air as its condition departs from that desired within the space, such control means acting also to prevent overheating during winter operation by increasing the admission of fresh air whenever the temperature within the space rises above a predetermined value. More specifically, it is an object of my invention to provide a fresh air damper control means employing an inside thermostat and an outside thermostat, these thermostats being so arranged that the control of the fresh air damper is automatically shifted from one controller to the other upon changes in temperature within and outside the conditioned space.

A further object is the provision of an air conditioning system with a fresh air inlet controlling means which acts to prevent the admission of air to the system whenever the power to the system should fail, or whenever the humidity within the conditioned space becomes excessive.

A still further object is the provision of an air conditioning system of the type employing a damper controlled by-pass around a plurality of conditioning devices, with means for adjusting the by-pass damper and controlling the conditioning devices in accordance with the condition of the air within the conditioned space, and for moving the by-pass damper to an extreme position whenever the controller for a selected one of the conditioned devices is moved from an extreme position.

Further objects will appear from the following description of my invention and from the appended claims. For a complete disclosure of my invention, reference is made to the accompanying drawing, the single figure of which indicates diagrammatically one form which my invention may take.

Figure 1:
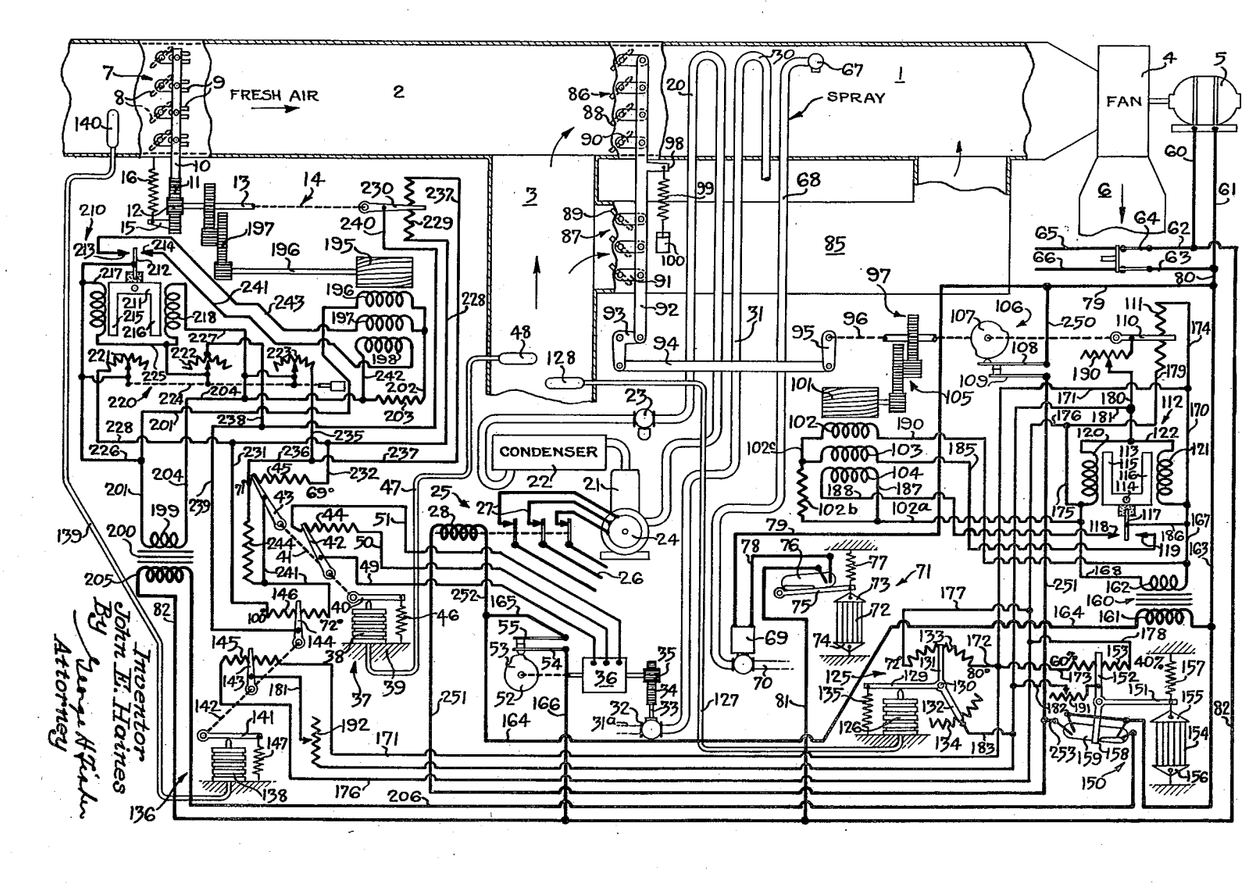

Referring now to the drawing, reference character 1 indicates a conditioning chamber. The inlet of this conditioning chamber is connected to a fresh air duct 2 and to a return duct 3, leading from the space to be conditioned (not shown). The discharge end of the conditioning chamber 1 is connected to a fan 4 which may be driven by an electric motor 5, and which discharges into a discharge duct 6 leading to the space to be conditioned. Located in the fresh air duct 2 is a fresh air damper arrangement generally indicated at 7. This damper arrangement comprises a plurality of movable blades 8 to which are connected actuating levers 9. Cooperating with the actuating levers 9 is a damper control member 10, the lower end of which is secured to gear rack 11 which cooperates with the pinion 12, this pinion being mounted upon the shaft 13 of a proportioning type of motor generally indicated at 14. Also connected to the control member 10 is a lug or ear 15 to which is attached a tension spring 16, the upper end of this spring being attached to a suitable stationary member such as the fresh air duct 2. This spring acts to urge the control member 10 upwardly, thereby tending to rotate the blades 8 in a counter-clockwise direction towards closed position. The proportioning motor 14 and the controls therefor will be described in detail later in this specification.

Located within the conditioning chamber 1 is a cooling coil 20. This coil is preferably of the direct expansion type and forms part of a compression refrigeration system comprising a compressor 21, a condenser 22 and an expansion valve 23. The operation of such compression refrigeration systems is well known in the art; and hence is not described here. The compressor 21 is preferably driven by an electrically driven motor 24, this motor being controlled by a magnetic starter or relay generally indicated at 25. Relay 25 comprises of three switch arms, each arm being connected to one of the line wires 26, and being arranged to cooperate with contacts to which are secured the wires 27 which lead to the compressor motor 24. These switch arms are connected to an armature (not shown) which cooperates with the relay coil 28. When the relay coil 28 is energized the armature located therein will be pulled to the left, this causing counter-clockwise rotation of the switch arms bringing them into engagement with their respective contacts, thereby connecting the line wires 26 to the compressor motor 24, and placing the compression refrigeration system into operation. When the relay coil 28 is deenergized however, the switch arms are moved in the opposite direction under the action of springs (not shown) thereby becoming disengaged from their respective contacts and placing the refrigeration system out of operation.

Also located in the conditioning chamber 1 is a heating coil 30, this coil being connected by a supply pipe 31 to the outlet of a control valve 32. The inlet of this control valve may be connected by pipe 31a to a source of suitable heating fluid such for instance as a steam boiler. To the valve stem 33 of control valve 32 is attached a gear rack 34 which cooperates with a pinion 35 which is mounted upon the main operating shaft of a proportioning motor 36. This proportioning motor may take the form shown and described in Patent Number 1,989,972 issued to Lewis L. Cunningham. This type of proportioning motor is adapted to be controlled by a potentiometer, the main operating shaft of such motor assuming angular positions corresponding to positions of the potentiometer slider upon the potentiometer coil.

In the present case the proportioning motor 36 is controlled by a potentiometer type of temperature controller generally indicated at 37. The controller 37 comprises a bellows 38 which is mounted at its lower end upon a fixed member such as 39, and which at its upper end cooperates with an actuating arm 40. The actuating arm 40 is secured to a shaft 41 upon which are mounted control arms 42 and 43. The control arm 42 cooperates with a control resistance 44 and the control arm 43 cooperates with a control resistance 45. The control arm 42 and control resistance 44 thus form one control potentiometer and the control arm 43 and resistance 45 form a second potentiometer. The free end of the actuating arm 40 is connected to a spring 46, this spring being connected at its lower end to the support 39. This spring thus urges the control arm 40 against the bellows 38. The interior of the bellows 38 is connected by a capillary tube 47 to a control bulb 48 which is located in the return air duct. The bulb 48, tube 47 and bellows 38 contain a suitable volatile fluid, the pressure of this fluid changing in accordance with the temperature of the bulb 48. As the return air temperature increases the pressure of the volatile fluid will increase, this causing expansion of the bellows 38 against the action of spring 46, this in turn rotating the actuating arm 40 in a counter-clockwise direction thus moving the control arms 42 and 43 across their respective resistance from right to left. Conversely upon a decrease in return air temperature the pressure of the volatile fluid will decrease, this causing the bellows 38 to contract, thus permitting clockwise rotation of the actuating arm 40 under the action of the spring 46, this in turn resulting in movement of control arms 42 and 43 across their respective resistances from left to right. It will be noted that the control arm 42 and the control resistance 44 are connected to the proportioning motor 36 by wires 49, 50 and 51, this forming a proportioning motor control system of the type disclosed in the Cunningham patent hereinbefore referred to. The controller 37 is preferably so designed and adjusted that when the return air temperature is below 69° F. the control arms 42 and 43 will engage the extreme right ends of their respective resistances, and so that when the return air temperature rises to 71° F. the control arms will engage the extreme left ends of their resistances. For values of temperature intermediate 69° F. and 71° F. the control arms will engage intermediate portions of their resistances. The arrangement of the potentiometer formed of control arm 42 and control resistance 44 is such that as the control arm moves from left to right (indicating falling temperature) the proportioning motor will progressively open the control valve 32, the control valve being closed when the control arm 42 engages the left end of resistance 44 and being wide open when the arm 42 engages the right end of resistance 44. It should therefore be apparent that when the return air temperature is above 72° F. the proportioning motor 36 will cause the valve 33 to be held in closed position. As the return air temperature falls below 71° F. however, the proportioning motor 36 will progressively open the steam valve 36, and when the return air temperature falls to 69° F. the valve 36 will be in wide open position.

The purpose of a control potentiometer formed by the arm 43 and resistance 45 will be described later in this specification. Referring again to the proportioning motor 36 it will be noted that a cam 52 is mounted upon the shaft of said motor. This cam is provided with a raised portion 53 which is adapted to engage a switch arm 54. This switch arm 54 carries a contact adapted for engagement with a similar contact mounted upon a stationary blade 55. When the cam 52 is rotated so that the raised portion 53 engages switch arm 54, the switch arm is moved upwardly thereby engaging the stationary arm 55. When, however, the cam 52 is rotated so that the raised portion 53 disengages switch arm 54, this switch arm drops away from the stationary blade thereby causing opening of the contacts. The cam 53 is mounted upon the proportioning motor shaft in such manner that the raised portion 53 engages the switch arm 54 when the control valve 32 is completely closed. Thus upon rotation of the proportioning motor to open the valve the cam 52 will be rotated causing the switch arm 54 to ride off the raised portion 53 thereby opening the switch formed of switch arm 54 and blade 55. The switch formed of members 54 and 55 is therefore closed whenever the steam valve is closed and is opened whenever the steam valve is moved from closed position. The purpose of this switch will become apparent as this description proceeds.

The fan motor 5 is connected by wires 60, 61, 62 and 63 to the double pole single throw switch 64, this switch 64 being connected to line wires 65 and 66. It will thus be seen that when switch 64 is closed, the fan motor 5 will be energized, thereby causing operation of the fan 4 to draw fresh and return air through the conditioning chamber and discharge it into the space to be conditioned. When the switch 64 is open however, the fan motor will be stopped.

Also located within the conditioning chamber 1 is a spray pipe 67, this spray pipe being connected by means of a water supply pipe 68 to the outlet of a solenoid valve 69. The inlet of this valve 69 may be connected to a suitable water supply source by pipe 70. The valve 69 is shown herein as comprising the type which opens when the solenoid is energized and which closes when the solenoid thereof is deenergized. For controlling the solenoid valve 69, a humidity controller 71 is located at any suitable point wherein it will be responsive to the humidity within the conditioned space. This humidity controller comprises a plurality of strands 72 of hair or other moisture responsive material, these strands being connected at their upper and lower ends by suitable clamping members 73 and 74. The lower clamping member 74 is connected to a suitable fixed support while the upper clamping member is connected to the free end of a pivoted mercury switch carrier 75 which carries a mercury switch 76. The free end of the switch carrier 75 is also connected to a tension spring 77 which may be secured at its upper end to a suitable fixed support. Upon a rise in humidity the strands 72 will increase in length thus permitting counter-clockwise rotation of the switch carrier 75 under the action of the spring 77, thus tilting the mercury switch 76 to open position. Upon a decrease in humidity however, the strands 72 will decrease in length thus rotating switch carrier 75 in a clockwise direction against the action of spring 77, thus tilting the mercury switch 75 to closed position. This instrument may be adjusted so that the mercury switch 76 remains open so long as the relative humidity remains above a desired value, for instance 35%, and so that when the relative humidity falls below this value the mercury switch 76 will be closed.

One terminal of mercury switch 76 is connected by wire 78 to one terminal of the solenoid valve 69, the other terminal of said solenoid valve being connected by means of wires 79 and 80 to the wire 63 which leads from the line switch 64. The other terminal of the mercury switch 76 is connected by wires 81 and 82 to the wire 62 which in turn is connected to the line switch 64. It should therefore be seen that the solenoid valve 69 and the mercury switch 75 are connected in series across the line switch 64. Thus when the line switch 64 is closed and the relative humidity within the conditioned space falls sufficiently to cause closing of mercury switch 76, the solenoid valve 69 will be opened thus permitting flow of water to the spray pipe 67 to humidify the air being passed to the conditioned space. This humidifying action will eventually result in the humidity within the space increasing, this causing the mercury switch 76 of the humidity controller 71 to open, this resulting in closing of the valve 69 and stopping of the humidifying spray. It should therefore be seen that the humidity controller 71 acts to control the valve 69 to maintain the humidity within the conditioned space above a predetermined value. It should be noted that the energizing current for the solenoid valve 69 is taken from the load side of the line switch 64. Thus whenever the line switch 64 is open to place the fan out of operation there will be no energizing current for the solenoid valve, and consequently no water can be supplied to the spray pipe 67 when the fan is out of operation.

A by-pass duct 85 is connected at its inlet end to the return duct 3, the outlet end of this by-pass duct connecting to the conditioning chamber 1 at a point downstream of the cooling coil 20, the heating coil 30, and the spray pipe 67. The duct 85 therefore acts to permit air to be by-passed around the air conditioning apparatus in the conditioning chamber 1. In order to control the relative proportions of the air passed through the conditioning apparatus and through the by-pass 85, a face damper 86 and a by-pass damper 87 are provided, these dampers being located respectively in the conditioning chamber 1 and the by-pass 85. The face and by-pass dampers 86 and 87 are of usual form comprising a plurality of pivoted rotatable blades 88 and 89 to which are secured actuating levers 90 and 91. The actuating levers 90 and 91 are in turn pivotally connected to a vertical actuating bar 92, this bar being connected at its lower end to a bell crank lever 93. Connected to the other arm of the bell crank lever 93 is a link 94, this in turn being connected to the actuating arm 95 which is mounted upon the shaft 96 of the proportioning motor generally indicated at 97. It will be observed that the rotatable blades 88 of the face damper 86 and the rotatable blades 89 of by-pass damper 87 are connected to the actuating member 92 with their angular positions 90° apart. By this arrangement when the actuating member 92 is shifted, one of the dampers will move towards closed position while the other of the dampers will move towards open position. For instance, when the actuating member 92 is shifted upwardly, the face damper 86 will be moved towards closed position while the by-pass damper 87 will be opened further. Mounted upon the actuating member 92 is a lug or ear 98 to which is attached a tension spring 99 which at its lower end may be attached to a suitable bracket 100. The spring 99 therefore acts to pull the actuating member 92 downwardly, this spring thus biasing the face damper 86 towards open position and the by-pass damper 87 towards closed position.

Referring again to the proportioning motor 97, this motor comprises a rotor 101, a holding coil 102, a driving coil 103 and a bucking coil 104. To the rotor 101 is attached a pinion gear which forms a part of a gear train 105, the last gear of this train rotating to shaft 96. As the rotor 101 drives the shaft 96, it should be apparent that rotation of rotor 101 for instance, in a clockwise direction as viewed from its left hand end will cause rotation of the arm 95 in a counter-clockwise direction, this movement being transmitted by the link 94 and bell crank 93 to the actuating member 92, moving this member upwardly against the action of spring 99 thereby opening the by-pass damper 87 and closing the face damper 86. As the rotor 101 in causing closing of the face damper 86 and opening of by-pass damper 87 must overcome the action of spring 99, it should be apparent that the spring 99 tends to cause rotation of the rotor 101 in the direction opposite to the direction just described, or in other words, a clockwise direction as viewed from the left hand end thereof. In order to overcome this tendency the holding coil 102 is provided, this coil being continuously energized and being so designed as to have a tendency to rotate the rotor 101 oppositely to the tendency of spring 99, the rotating tendency of a coil 102 just balancing the opposite rotating tendency of spring 99. The holding coil 102 therefore acts to just balance the biasing effect of the spring 99. The driving coil 103 is arranged to cause rotation of rotor 101 in a direction to cause opening of the by-pass damper 87 and closing of the face damper 86. When this coil is energized therefore, its action aided by the effect of the holding coil 102, will cause opening of the by-pass damper 87 and closing of the face damper 86. The bucking coil 104 is wound in the opposite direction to the coils 102 and 103 and preferably has the same number of turns as the holding coil 102, it therefore acting when energized to neutralize the holding effect of coil 102. Therefore, when the bucking coil 104 is energized, the holding effect of holding coil 102 will be neutralized, this permitting spring 99 to cause opening of the face damper 86 and closing of the by-pass damper 87. It should now be apparent that the proportioning motor 97 is of the spring return type, this motor acting to drive the face damper 86 to closed position when the driving coil 103 is energized, and permitting its being driven by the spring 99 when the bucking coil 104 is energized.

Mounted upon the proportioning motor shaft 96 is an auxiliary switch 106, this switch comprising a cam 107 and switch blades 108 and 109, the switch blade 108 being formed as a cam follower. The cam 107 is provided with a raised portion and a recessed portion and this cam is so positioned upon shaft 96 that the follower 108 will ride off the raised portion onto the recessed portion when the proportioning motor shaft is moved to a position which causes complete closing of the face damper 86 and opening of the by-pass damper 87. Therefore when the proportioning motor shaft is rotated to this extreme position, the blade or follower 108 will be urged upwardly by a spring (not shown) this causing opening of the switch formed by blades 108 and 109. When, however, the proportioning motor shaft is rotated from this extreme position, the raised portion of cam 107 will press the blade or follower 108 downwardly so that its contact engages the contact carried by the blade 109, this causing closing of the switch. Therefore whenever the face damper 86 is closed, the auxiliary switch 106 will be open, but when the face damper 86 begins to open, the auxiliary switch 106 will be closed. The purpose of this switch will appear as this description proceeds. Also mounted upon the proportioning motor shaft 96 is a balancing arm 110, this arm being arranged to cooperate with a balancing resistance 111 to form a balancing potentiometer. The purpose of this balancing potentiometer will appear presently.

In order to control the energization of the driving coil 103 and the bucking coil 104, a relay 112 is provided, this relay comprising a U-shaped armature 113 which is pivoted at 114 and has legs 115 and 116. Secured to the armature 113 by an insulating member is a switch arm 117, this switch arm cooperating with contacts 118 and 119. Cooperating with the leg 115 of the U-shaped armature 113 is a relay coil 120 and cooperating with the leg 116 is a similar coil 121, the coils 120 and 121 being connected together at their upper ends by a wire 122. When coils 120 and 121 are equally energized their effect upon the armature 113 will be equalized, this resulting in the armature assuming a position wherein the switch arm 117 is disengaged from both contacts 118 and contact 119. If, however, the relay coil 120 is energized to a greater extent than the relay coil 121, the leg 115 of the armature will be pulled upwardly, this causing engagement of switch arm 117 with contact 118. Conversely should relay coil 121 be energized more highly than the relay coil 120, the armature 113 will be rotated in the opposite direction bringing switch arm 117 into engagement with contact 119.

Reference character 125 designates generally a return duct temperature controller, this controller comprising a bellows 126 which is attached by a capillary tube 127 to a control bulb 128 located in the return duct 3. The bellows 126, tube 127 and bulb 128 are filled with the usual volatile fluid in the manner well known in the art to cause the pressures within the bellows 126 to vary in accordance with the return air temperature. Cooperating with the bellows 126 is an actuating arm 129, this arm being pivoted at 130 and being secured to a control arm 131 and to a corrector arm 132. The control arm 131 is arranged to engage a control resistance 133 while the corrector arm 132 is arranged to engage a center tapped corrector resistance 134. Also secured to the actuating arm 129 is a spring 135, this spring being arranged to bias the actuating arm 129 against the bellows 126. Upon an increase in temperature within the return duct 3 the pressure within the bellows 126 will increase, this causing clock-wise rotation of the actuating arm 129 against the action of spring 135, this resulting in clock-wise rotation of the arms 131 and 132 across their respective resistances. Upon a decrease in return air temperature the pressure within the bellows 126 will decrease, thus permitting the spring 135 to rotate the actuating arm 129 in the opposite direction, this causing movement of the arms 131 and 132 in the opposite direction across their respective resistances. This return air temperature controller 125 is so designed and adjusted that when the return air temperature is 72° F. the bellows 126 will be contracted sufficiently to allow the control arm 131 to engage the extreme left hand end of control resistance 133. As the return air temperature increases the control arm 131 will be moved to the right across resistance 133 and when the return air temperature rises to 80° F. the arm 131 will engage the extreme right hand end of resistance 133.

The reference character 136 indicates generally an outside temperature responsive controller, this controller comprising a bellows 138 which is connected by a capillary tube 139 to a control bulb 140 which is located in the fresh air duct 2. Cooperating with the bellows 138 is a control arm 141 which is mounted upon a shaft 142. Also mounted upon the shaft 142 are control arms 143 and 144, these control arms cooperating with control resistances 145 and 146 respectively. Urging the actuating arm 141 against the bellows 138 is a tension spring 147. The bellows 138, tube 139 and control bulb 140 are filled with the usual volatile fluid. Upon an increase in fresh air temperature the bellows 138 will be expanded against the action of spring 147, this rotating the actuating arm 141 and consequently the control arms 143 and 144 in a counter-clockwise direction across their respective control resistances. Upon a decrease in fresh air temperature the opposite action will take place, the spring 147 causing movement of control arms 143 and 144 in the opposite direction. This instrument is preferably so designed and adjusted that when the fresh air temperature is 72° F. the control arms 143 and 144 will engage the extreme right hand ends of their control resistances. As the fresh air temperature rises the control arms 143 and 144 will be rotated towards the left across their resistances and will engage the extreme left hand ends thereof when the fresh air temperature rises to 100° F.

Reference character 150 indicates generally a humidity controller, this controller comprising a bell crank member having an actuating arm 151 and a control arm 152, said control arm cooperating with a control resistance 153 to form a potentiometer. Secured to the free end of the actuating arm 151 is a humidity responsive device comprising a plurality of strands 154 of humidity responsive material these strands being connected at their upper and lower ends by clamping members 155 and 156. The upper clamping member 155 is secured to the actuating arm 151 while the lower clamping member 156 is secured to a suitable fixed support. Also connected to the free end of actuating arm 151 is a spring 157, this spring acting to urge the free end of arm 151 upwardly to maintain the strands 154 taut. Upon an increase in humidity the strands 154 will increase in length this permitting the spring 157 to rotate the actuating arm 151 in a clockwise direction, this causing the control arm 152 to move across the control resistance 153 from right to left. Upon a decrease in humidity, the strands 154 will decrease in length, this causing movement of a control arm 152 in the opposite direction. This instrument may be arranged so that when the relative humidity is 60 percent the control arm 152 will engage the extreme left hand end of resistance 153. When, however, the relative humidity falls to a value, for instance, 40 percent the control arm 152 will engage the extreme right hand end of control resistance 153. Also mounted upon the bell crank lever formed of arms 151 and 152 is a mercury switch carrier 158 which carries a mercury switch 159. Mercury switch 159 is herein illustrated as being of the double throw type and is so mounted upon the bell crank lever that the right hand contacts will remain made so long as the relative humidity is below the extreme value for which the controller is set. When however, the relative humidity rises to this value, the mercury switch 159 will be tilted sufficiently to cause opening of the right hand contacts and closing of the left hand contacts. The purpose of this mercury switch will appear later.

Reference character 160 indicates a step-down transformer having a primary 161 and a secondary 162. The right hand end of primary 161 is connected to the line wire 63 by means of wires 80 and 163. The other side of the transformer primary 161 is connected by wires 164 and 165 to the blade 55 of the auxiliary switch mounted upon the steam valve proportioning motor shaft 36. The other blade of this switch is connected by wires 166 and 82 to the line wire 62. The energizing current for the transformer primary 161 therefore passes through the auxiliary switch upon the steam valve. So long as the steam valve remains closed the auxiliary switch will be likewise closed and the primary 161 of transformer 160 will be energized.

One side of the secondary 162 of transformer 160 is connected by wire 167 to the lower end of the relay coil 121 and the other side thereof is connected by a wire 168 to the lower end of relay coil 120. The relay coils 120 and 121 are therefore connected in series across the transformer secondary 162. Connected also to the lower end of relay coil 121 is a wire 170 which in turn is connected to the wire 171, this wire 171 leading to the right hand end of the control resistance 145 of the outside temperature responsive controller 136. Also connected to the wire 171 is a wire 172 which leads to the right hand end of control resistance 133 of the temperature controller 125, and a wire 173 which leads to the left hand end of the control resistance 153 of the humidity controller 150. Connected also to the wire 171 is a wire 174 which leads to the upper end of the balancing resistance 111. To the lower end of the relay coil 120 is connected a wire 175, this wire being connected to a wire 176 which leads to the left hand end of the control resistance 145. This wire 176 is also connected to the left hand end of control resistance 133 by wire 177, to the right hand end of control resistance 153 by wire 178, and to the lower end of the balancing resistance 111 by the wire 179. From the foregoing wiring arrangement it should be seen that the control resistances of the indoor temperature controller 125, the outdoor temperature controller 136, the humidity controller 150, and the balancing resistance 111 are connected in parallel across the secondary 162 of transformer 160 together with the relay coils 120 and 121 which are connected across said transformer secondary in series. Connected to the wire 122 which joins the upper ends of relay coils 120 and 121 is a wire 180, this wire leading to the balancing arm 110 of the balancing potentiometer. Attached to the wire 180 is a wire 181 which wire leads to the control arm 143 of the outside temperature responsive controller 136. To the wire 181 is attached a wire 182, this wire being in turn connected to the control arm 152 of the humidity controller 150. Also attached to wire 181 is a wire 183, this wire being connected to the corrector resistance 134 of the return air temperature controller 125. As the corrector arm 132 of said controller contacts the corrector resistance 134, the control arm 131 is thereby connected electrically to the wire 183. From the foregoing it should be apparent that the control arms 131, 143 and 152 of the controllers 125, 136 and 150 are connected to the upper ends of the relay coils 120 and 121 together with the balancing arm 110 of the balancing resistance. By this arrangement a portion of each control resistance and the balancing resistance is connected in parallel with one relay coil and the remaining portion of each of the control resistances and the balancing resistance are connected in parallel with the other relay coil. For instance, the portion of the balancing resistance 111 between the balancing arm 110 and the lower end of said resistance is connected in parallel with the relay coil 120 by a circuit as follows: wire 122, wire 180, balancing arm 110, lower portion of balancing resistance 111, wire 179, and wire 175 to the lower end of relay coil 120. In a similar manner the upper portion of the balancing resistance is connected in parallel with the relay coil 121.

With the various control arms and the balancing arm engaging the center of their respective resistances as shown, the relay coil 120 will have the same amount of resistance in parallel therewith as has the relay coil 121. Under this condition the relay coils 120 and 121 will be equally energized, this causing the armature 113 to assume the mid-position shown. If the return air temperature should now decrease the control arm 131 of the temperature controller 125 will be moved to the left across the control resistance 133, thus decreasing the portion of control resistance 133 which is in parallel with the relay coil 120 and increasing the portion of said control resistance which is in parallel with the relay coil 121. This will have the effect of increasing the current flow in relay coil 121 and decreasing the flow in relay coil 120, thus causing the armature 113 to be rotated in a counter-clockwise direction bringing switch arm 117 into engagement with the contact 119. Engagement of switch arm 117 with contact 119 will cause energization of the driving coil 103 by the following circuit: transformer secondary 162, wire 168, wire 102a, resistance 102b, driving coil 103, wire 185, contact 119, switch arm 117, wire 186, and wire 167 to transformer secondary 162. Energization of driving coil 103 will cause rotation of the rotor 101 in a direction to cause rotation of the proportioning motor shaft 96 counter-clockwise, this causing movement of the actuating member 92 upwardly against the action of spring 99 to close the face damper 86 and to open the by-pass damper 87. At the same time the balancing arm 110 will be moved upwardly across the balancing resistance 111 thus decreasing the portion of said balancing resistance which is in parallel with the relay coil 121 and increasing the portion of said resistance which is in parallel with the relay coil 120. This action causes a decrease in current flow in relay coil 121 and an increase in current flow through relay coil 120, thereby tending to neutralize or balance out the initial unbalancing action caused by the controller 125. When the movement of the balancing arm 110 across the resistance 111 is sufficient to completely neutralize the initial unbalancing action of controller 125, the current flow in relay coils 120 and 121 will be equalized, this causing switch arm 117 to disengage contact 119 thereby deenergizing the driving coil 103. As the holding coil 102 is constantly energized and as its effect is to overcome the biasing action of spring 99, the proportioning motor will remain in this new position in spite of the action of spring 99. It will be noted that the constant energization of holding coil 102 above mentioned is caused by this coil being connected across the transformer secondary 162 by means of wire 168, wire 102a, resistance 102b, wire 102c, and wire 190. As the driving coil 103 will remain energized so long as the relay 112 is unbalanced in the direction just described, and as the balancing action of the balancing potentiometer is proportionate to the movement of the shaft 96, it follows that the movement of shaft 96 to overcome the initial unbalancing action of the controller 125 must be proportionate to the initial unbalancing action of said controller. Therefore, the further that the control arm 131 is moved across the resistance 133, the greater the movement required of shaft 96 to rebalance the relay. The assumed angular position of shaft 96 will therefore correspond to the position of the control arm 131 on the control resistance 133.

If the return air temperature should now increase, the control arm 31 will be moved to the right across control resistance 131, thus decreasing the portion of said resistance which is in parallel with relay coil 121 and increasing the portion of the said resistance which is in parallel with the relay coil 120. This in turn will cause a decrease in current flow in coil 121 and an increase in flow of current in coil 120, this causing clockwise rotation of the relay armature 113 bringing the switch arm 117 into engagement with the contact 118. This will cause energization of the bucking coil 104 by the following circuit: secondary 162, wire 168, wire 102a, wire 187, bucking coil 104, wire 188, contact 118, switch arm 117, wire 186, and wire 167 to secondary 162. Energization of bucking coil 104 will neutralize the holding effect of the holding coil 102, this permitting the spring 99 to cause movement of the face damper 86 towards open position and the by-pass damper 87 towards closed position, simultaneously with rotating the proportioning motor shaft in a clockwise direction, this causing downward movement of the balancing arm 110 across resistance 111. This will decrease the portion of the balancing resistance which is in parallel with the relay coil 120 and increase the portion of said resistance in parallel with the relay coil 121 which in turn results in a decreasing of current flow in relay coil 120 and an increasing of current flow in relay coil 121. When this movement of the balancing arm 110 is sufficient to overcome the initial unbalancing action of the controller 125, the relay coils 120 and 121 will again become equally energized, this resulting in deenergization of the bucking coil 104. Upon deenergization of the bucking coil 104 the holding coil 102 will again become active, this stopping rotation of the motor by spring 99 and holding the dampers in their new positions. It should therefore be seen that the position of the dampers 86 and 87 is controlled in accordance with the return air temperature, the face damper 86 being gradually opened as the return air temperature rises, and being gradually closed as the return air temperature falls.

Assuming that the outside air and return air temperatures remain constant, should the relative humidity increase, the control arm 152 of humidity controller 150 would be moved to the left across the control resistance 153, this resulting in decreasing the portion of said resistance which is in parallel with the relay coil 121, and increasing the portion of said resistance which is in parallel with the relay coil 120. This will cause a greater current flow in relay coil 120 than in the relay coil 121, which in the manner hereinbefore described will cause engagement of the switch arm 117 with the contact 118, this causing energization of the bucking coil 104. This will result in neutralizing the effect of holding coil 102 thereby permitting spring 99 to move the face damper 86 towards open position, this causing driving of the proportioning motor shaft 96 in a direction to move the balancing arm 110 downwardly across the balancing resistance 111, this action gradually neutralizing the initial unbalancing action on the relay 112 caused by the humidity controller. When the movement of the damper 86 is sufficient to cause the balancing potentiometer to rebalance the relay, the bucking coil 104 will be deenergized thereby allowing the holding coil 102 to stop the proportioning motor shaft in its new position. An increase in humidity therefore acts to increase the opening of the face damper 86 and to decrease the opening of the by-pass damper 87. In a manner which should now be apparent, a decrease of humidity will cause operation of the proportioning motor in a direction to move the face damper 86 towards closed position and to increase the opening of the by-pass damper 87.

Assuming that the return air temperature and relative humidity remain constant, should the outside temperature increase, the bellows 138 of the outside temperature controller 136 will expand this causing travel of the control arm 143 to the left across control resistance 145. This will have the effect of decreasing the portion of control resistance 145 which is in parallel with the relay coil 120 and increasing the portion of said control resistance which is in parallel with the relay coil 121, this resulting in a decrease of current flow in coil 120 and an increase in current flow in coil 121. This unbalancing will cause the switch arm 117 to engage the contact 119 this energizing the driving coil 103 which causes the shaft 96 to be rotated in a direction to effect closing of the face damper 86 and opening of the by-pass damper 87, against the action of spring 99. Meanwhile the balancing arm 110 will be moved upwardly across the balancing resistance 111 to neutralize the initial unbalancing effect of the controller 136 on the relay 112. When the movement of the balancing arm 110 and consequent movement of the dampers is sufficient to cause rebalancing of the relay 112, the driving coil 103 will be deenergized this causing the dampers to be held in their new positions. In a similar manner upon a decrease of outside temperature the control arm 143 of the controller 136 will be moved to the right across the control resistance 145, this causing the proportioning motor 97 to travel in a direction to increase the opening of the face damper 86 to decrease the opening of the by-pass damper 87. The outside temperature controller therefore acts to move the face damper towards closed position upon an increase in outside temperature, and to move said damper towards open position upon a decrease in outside temperature.

It will be noted that a rheostat 190 is interposed in the wire 180 which leads from the upper ends of relay coils 120 and 121 to the balancing arm 110 of the balancing potentiometer. The purpose of this rheostat is to desensitize said balancing potentiometer to thereby increase the sensitivity of the return air controller 135. As pointed out hereinbefore, when the control arm 131 of the controller 135 moves across the control resistance 133 it will cause unbalancing of the current flows in the relay coils 120 and 121. In order to rebalance the current flows in relay coils 120 and 121 the balancing arm 110 must move across its control resistance to effect an opposite change in current flows to that caused by the controller 135. The rheostat 190 by increasing the resistance to current flow through the balancing potentiometer increases the necessary movement of the balancing arm 110 across the balancing resistance 111 to effect rebalancing of the relay 112. By properly adjusting the rheostat 190, the balancing potentiometer may be so desensitized that a movement throughout its entire range is necessary to rebalance the unbalancing effect caused by movement of a control arm 131 across its resistance 133 corresponding to a 2° F. temperature change. By this arrangement the operating range of the controller 135 may be made materially less than its total range, and a return air temperature change of but 2° F. may cause movement of the dampers 86 and 87 from one extreme position to the other, even though the total range of the controller 135 is 8° F.

As hereinbefore described the effect of the humidity controller 150 is to cause opening of the face damper 86 and closing of the by-pass damper 87 as the humidity within the conditioned space increases. The controller 150 also has the effect of decreasing the opening of the face damper 86 and increasing the opening of by-pass damper 87 as the humidity decreases. As the cooling effect of the conditioner is increased upon increase in opening of the face damper 86 and decrease in opening of the by-pass damper 87, the humidity controller 150 therefore acts to increase the cooling effect of the conditioner upon increase in humidity, and to decrease the cooling effect upon a decrease in humidity. Assuming now that the return air temperature remains constant, but that the humidity within the conditioned space increases, the humidity controller 150 will act in the manner hereinbefore described to increase the opening of the face damper 86 and to decrease the opening of by-pass damper 87. This increase in cooling effect will cause the space temperature to decrease. The temperature controller 125 in response to this decrease in temperature will in the manner hereinbefore described cause movement of the face damper 86 towards closed position and the by-pass damper 87 towards open position, this resulting in decreasing of the cooling effect of the conditioner. When the space temperature has fallen enough to cause controller 125 to decrease the cooling effect sufficiently to prevent further drop in temperature, the temperature will again remain constant at this point. In a similar manner if the humidity should decrease, the humidity controller 150 will cause the dampers 86 and 87 to be positioned so as to decrease the cooling effect, this decrease in cooling effect resulting in rise in return air temperature. The return air temperature controller 125 will act in response to this rise in temperature to increase the cooling effect and when the return air temperature rises sufficiently to cause controller 125 to increase the cooling effect sufficiently to prevent further rise in temperature, the temperature will remain constant at this value. It should be seen therefore that the effect of the humidity controller 150 is to raise the temperature maintained by the controller 125 when the relative humidity decreases, and to lower the temperature maintained by said controller as the relative humidity increases. In other words, the humidity controller 150 acts to change the control point of the temperature controller 125. It will be noted that interposed in the wire 173 which leads to the control arm 152 of the humidity controller 150, is a rheostat 191. The purpose of this rheostat is to adjust the effect of the humidity controller 150 upon the control point of the return air temperature controller 125. By properly adjusting this rheostat the change in control point of the temperature controller caused by the humidity controller may be made just sufficient to compensate for the chacnge in comfort or effective temperature caused by the change in humidity. By this arrangement therefore a constant effective or comfort temperature within the conditioned space may be maintained.

As hereinbefore described the effect of the outside temperature controller 136 is to decrease the cooling effect of the conditioner as the outside temperature increases and to increase said cooling effect as the outside temperature decreases. This controller therefore acts in opposition to the return air temperature controller 125. Assuming that the outside temperature should increase, the controller 136 will cause movement of the face damper 86 to restrict the cooling effect of the conditioner, this decrease in cooling effect of the conditioner and the accompanying increase in cooling load caused by the increase in outside temperature, will result in a rise in return air temperature. The temperature controller 125 in response to this rise in temperature will gradually open the face damper 86 as the return air temperature increases thus progressively increasing the cooling action of the conditioner. When the return air temperature has increased sufficiently to cause an increase in cooling action sufficient to prevent further temperature increase, the return air temperature will be maintained constant at this higher value. It will be seen therefore that the effect of the outside temperature responsive controller 136 is to raise the control point of the return air temperature controller 135 as the outdoor temperature increases. It should also be apparent that the effect of the outside temperature responsive contriller 136 will be to lower the control point of the return air temperature controller as outside temperature decreases. Interposed in the wire 181 which leads from the upper ends of the relay coils 120 and 121 to the control arm 143 of the temperature controller 136 is a rheostat 192. The purpose of this rheostat is to provide adjustment of the effect of the outdoor temperature responsive controller 136 upon the control point of the return air temperature controller 125. By properly adjusting this resistance the controller 136 may cause a rise of the return air temperature control point of slightly less than 1° F. for each 3° F. rise in outdoor temperature. Therefore, when the outdoor temperature is 72° F. the control point of the indoor controller may be lowered to 72° F. As the outside temperature increases the indoor temperature will be increased slightly less than 1° F. for each 3° F. rise in outdoor temperature and thus when the outdoor temperature rises from 72° F. to 100° F. the indoor temperature control point may be raised from 72° F. to 80° F.

From the foregoing it should be apparent that the controllers 125 and 150 act to control the face and by-pass dampers 86 and 87 to maintain a constant effective or comfort temperature within the conditioned space for any given value of outdoor temperature. It should further be apparent that the outdoor temperature responsive controller 136 acts to raise or lower the effective temperature maintained by the controllers 125 and 150 in accordance with outside temperature to maintain a varying differential between inside and outside temperature as desired in usual air conditioning practice.

Referring again to the fresh air damper 7 this damper is controlled by the proportioning motor 14. This motor is of the same type as the proportioning motor 97 previously described, and comprises a rotor 195 mounted upon a shaft 196, this shaft being connected through a gear train 197 to the main operating shaft 13 which in turn adjusts the position of the fresh air damper 7. Cooperating with the rotor 195 to form a spring return type of motor is a holding coil 196, a driving coil 197, and a bucking coil 198. The holding coil 196 is connected across the secondary 199 of the step-down transformer 200 by means of wires 201, 202, resistance 203, and wire 204. The holding coil 196 is therefore energized so long as the primary 205 of the transformer 200 is energized, this holding coil acting to produce torque upon the rotor 195 to overcome the driving tendency of the spring 16. Referring again to the transformer 200 one side of the primary thereof is connected to the line wire 62 by means of the wire 82. The other side of said primary 205 is connected to the line wire 63 by means of wires 163 and 206, the wire 163 leading from the line wire 63 to one of the right hand contacts of mercury switch 159 which is mounted upon the humidity controller 150, and the wire 206 leading from the other of said contacts to the transformer primary. The transformer primary 205 is therefore connected to the line wires 62 and 63 in series with the right hand contacts of mercury switch 159.

For controlling the energization of the driving coil 197 and the holding coil 198 of motor 14 there is a relay 210, this relay being similar in all respects to the relay 112 previously described. Relay 210 comprises a pivoted U-shaped armature 211 having mounted thereupon by means of an insulating connection a switch arm 212, this switch arm cooperating with opposed contacts 213 and 214. The U-shaped armature 211 is provided with legs 215 and 216 which cooperate with relay coils 217 and 218 respectively.

Reference character 220 indicates generally a three-gang rheostat, this rheostat comprising three separate rheostats 221, 222 and 223, these rheostats being actuated simultaneously by a shaft 224 to which is secured a suitable adjusting knob. The rheostats 221 and 223 are arranged oppositely to each other so that as the shaft 224 is rotated the resistance of one of said rheostats will be increased while the resistance of the other will be decreased. The rheostat 222 however is of the center tap type, this arrangement causing an increase in resistance whenever the control arm of said rheostat is moved from mid-position in either direction.

The lower ends of the relay coils 217 and 218 are connected together by a wire 225, while the upper end of the relay coil 217 is connected to the left terminal of transformer secondary 199 by wires 226 and 201. The upper end of the relay coil 218 is connected to the transformer secondary 199 by the wires 204 and 227. The relay coils 217 and 218 are therefore connected in series across the secondary 199 of the transformer 200. The upper end of the relay coil 217 is connected by means of the wire 226 and rheostat 221 to the wire 228 which leads to the lower end of the balancing resistance 229 which cooperates with the balancing arm 230 mounted upon the proportioning motor shaft 13. The wire 228 is also connected by means of the wire 231 to the left hand end of the control resistance 146 of the outdoor temperature responsive controller 136, and by the wire 232 to the right hand end of the control resistance 45 of the return air temperature controller 37. The upper end of the relay coil 218 is connected by means of wire 227 and the rheostat 223, to the wire 235, this wire being connected by means of wires 236 and 237 with the left hand end of control resistance 45, and with the upper end of the balancing resistance 229 respectively. The wire 225 which joins the lower ends of the relay coils 217 and 218 is connected to the rheostat 222, this rheostat in turn being connected by wires 238, 239 and 240 with the control arm 144 of the temperature controller 136 and with the balancing arm 230 of the balancing potentiometer. The right hand end of the control resistance 146 is connected by means of wire 241 with the control arm 43 of the return air temperature controller 37. By the wiring arrangement just described the balancing resistance 229 is connected across the terminals of the transformer secondary 199 in parallel with the relay coils 217 and 218 by means of wires 201, 226, rheostat 221, wire 228, wire 237, wire 235, rheostat 223 and wires 227 and 204, also the control resistance 45 of the return air temperature controller is likewise connected across the transformer secondary 199 by wires 201, 226, rheostat 221, wire 228, wire 232, wire 236, wire 235, rheostat 223 and wires 227 and 204. When the control arm 43 of the controller 37 engages the extreme left hand end of control resistance 45 the control resistance 146 of the controller 136 will be connected across the transformer secondary as follows: wire 201, wire 226, rheostat 221, wire 228, wire 231, resistance 146, wire 241, control arm 43, wire 236, wire 235, rheostat 223 and wires 227 and 204 to secondary 199. It should therefore be seen that the balancing resistance 229 and the control resistance 45 are constantly connected across transformer secondary 199, and that the control resistance 146 is connected across said secondary when the control arm 43 engages the extreme left portion of control resistance 45. With the wiring arrangement described it should also be observed that the lower ends of the relay coils 217 and 218 are connected constantly to the balancing arm 230 of the balancing potentiometer and to the control arm 144 of the controller 136. With the control arm 43 engaging the extreme left hand end of control resistance 45, the portion of the control resistance 146 between the right hand end thereof and the control arm 144 will be connected in parallel with the relay coil 218 as follows: lower end of relay coil 218, wire 225, rheostat 222, wire 238, wire 239, control arm 144, right half of control resistance 146, wire 241, switch arm 43, wire 236, wire 235, rheostat 223, and wire 227 to upper end of relay coil 218. Also the portion of the control resistance 146 between the control arm 144 and the left hand end of said resistance will be connected in parallel with the relay coil 217 by wire 226, rheostat 221, wire 228, wire 231, left half of resistance 146, control arm 144, wire 239, wire 238, rheostat 222 to wire 225. It should therefore be seen that when the control arm 43 of the temperature controller 37 is at its extreme left hand position, the potentiometer of controller 136 formed by arm 144 and resistance 146 will be in control of the relative energizations of relay coils 217 and 218. As the balancing potentiometer formed of arm 230 and resistance 229 is constantly connected to the relay coils 217 and 218, the position of the proportioning motor shaft 13 will correspond to the position of the arm 144 on the resistance 146 of the outdoor temperature controller 136.

With the parts in the position shown the return air temperature is above 71° F. as indicated by the control arm 43 engaging the extreme left hand end of control resistance 45, this in the manner previously described placing the potentiometer formed of arm 144 and resistance 146 in control of the relay 210. Also the outdoor temperature is approximately 86° F. this causing the arm 144 to engage the center of resistance 146. The portion of resistance 146 in parallel with the relay coil 217 is therefore equal to the portion of said resistance in parallel with relay coil 218. For this position the proportioning motor shaft 13 is rotated to open the fresh air damper half way and to place the balancing arm 230 at the center of its resistance 229. The relay 210 is therefore balanced and neither the driving coil 197 nor the bucking coil 198 is energized. The holding coil 196 is therefore holding the damper in the position shown against the action of the spring 16.

If now should the outside temperature increase, the bellows 138 will be expanded this causing the control arm 144 to be moved towards the left hand end of control resistance 146. This will act to decrease the portion of control resistance 146 which is in parallel with the relay coil 217 and to increase the portion of said control resistance which is in parallel with the relay coil 218, this causing a decrease in current flow in coil 217 and increasing the current flow in relay coil 218. This unbalancing of the current flows will cause the leg 216 of the U-shaped armature to be pulled downwardly thereby bringing the switch arm 212 into engagement with contact 214, this causing energization of the bucking coil 198 by a circuit as follows: transformer secondary 199, wire 201, wire 226, switch arm 212, contact 214, wire 241, bucking coil 198, wire 242 and wire 204 to secondary 199. Energization of the bucking coil 198 will neutralize the holding effect of coil 196 this permitting the spring 16 to move the fresh air damper towards closed position, this in turn rotating the proportioning motor shaft 14 in a direction to cause upward travel of the balancing arm 230 across the balancing resistance 229. This movement of the balancing arm 230 decreases the portion of balancing resistance 229 which is in parallel with relay coil 218 and increases the portion of said resistance which is in parallel with the relay coil 217, thereby causing the current flow in relay coil 218 to be decreased and causing the current flow in coil 217 to be increased, this tending to neutralize the initial unbalancing effect on the relay caused by controller 136. When the spring 16 has moved the damper 7 sufficiently towards closed position that the balancing potentiometer rebalances the relay, the bucking coil 198 will become deenergized thereby permitting the holding coil 196 to hold the damper in this new position. It should therefore be seen that upon an increase in outside temperature, the controller 136 will cause the fresh air damper 7 to be progressively moved towards closed position. As the upper limit of the range of controller 136 is 100° F. it should be apparent that when the outside temperature reaches 100° F. the fresh air damper 7 will be completely closed.

If now should the outside temperature decrease, the bellows 138 of controller 136 will contract, this causing movement of the control arm 144 to the right across control resistance 146, this decreasing the portion of said control resistance which is in parallel with the relay coil 218 and increasing the portion of said resistance which is in parallel with the relay coil 217. The result of this will be to increase the current flow in coil 217 and to decrease the current flow in coil 218, this causing engagement of the switch arm 212 with the contact 213 which energizes the driving coil 197 by a circuit as follows: transformer secondary 199, wire 201, wire 226, switch arm 212, contact 213, wire 243, driving coil 197, wire 202, resistance 203 and wire 204 to transformer secondary 199. This will cause rotation of the rotor 195 in a direction to drive the fresh air damper towards open position, this at the same time causing movement of the balancing arm 230 downwardly across balancing resistance 229, this having the effect of progressively decreasing the current flow in relay coil 217 and increasing the current flow in relay coil 218. When the movement of the fresh air damper 7 towards open position is sufficient to cause the balancing potentiometer to cause neutralizing of the unbalancing effect of the controller 136, the relay 210 will again become balanced, this causing deenergization of the driving coil 197 which results in stopping of the motor with the damper in this new position. It should be apparent from the foregoing that as the outside temperature decreases the fresh air damper will be progressively moved towards open position. As the lower limit of the range of the outside temperature controller is 72° F. the fresh air damper will become completely open when the outside temperature falls to this value.

When the outside temperature falls to 72° F. the control arm 144 will engage the extreme right hand end of the control resistance 146 this having the effect of connecting the control arm 43 of the controller 37 to the junction of the relay coils 217 and 218 as follows: wire 225, rheostat 222, wire 238, wire 239, control arm 144 and wire 241 to control arm 43. At this time it will be observed that the entire control resistance 146 will be in parallel with the relay coil 217 by connections as follows: relay coil 217, wire 226, rheostat 221, wire 228, wire 231, resistance 146, arm 144, wire 239, wire 238, rheostat 222 to wire 225. This of course will tend to cause a reduction in current flow through the relay coil 217. In order to neutralize this effect upon the balancing of the relay 210 a resistance 244 is connected between the left hand end of the control resistance 45 and the right hand end of control resistance 146, this resistance being of equal value to the control resistance 146. The resistance 244 it will be observed is connected in parallel with the relay coil 218 as follows: (when control arm 144 engages the right hand end of control resistance 146) coil 218, wire 227, rheostat 223, wire 235, wire 236, resistance 244, wire 241, control arm 144, wire 239, wire 238, rheostat 222 and wire 225 to coil 218. The resistance 244 therefore acts to balance out the unbalancing effect of a resistance 146 occurring when the control arm 144 engages the extreme right hand end thereof. At this time the potentiometer formed of the control arm 43 and the control resistance 45 will therefore be placed in control of the relay 210. The control of the fresh air damper is therefore shifted from the outdoor temperature responsive controller 136 to the return air temperature controller 37.

So long as the return air temperature is above 71° F. the control arm 43 will engage the extreme left hand end of control resistance 45. This will cause the entire control resistance 45 to be connected in parallel with the relay coil 217 and complete shunting of the relay coil 218, which will result in the fresh air damper remaining at its wide open position. If now should the outside temperature fall, the inside temperature will eventually follow, this reduction in inside temperature causing the control arm 43 to be moved away from its extreme position towards the right hand end of the control resistance 45. This is the manner which should now be apparent will cause gradual closing of the fresh air damper. As the lower limit of the range of controller 48 is 69° F. the control arm 43 will engage the extreme right hand end of resistance 45 when the return air temperature falls to 69° F. this causing complete closing of the fresh air damper.

From the foregoing it should be apparent that my novel fresh air damper control system will act to progressively cause opening of the fresh air damper as the outside temperature falls from a maximum value towards the temperature maintained within the conditioned space, it should also be seen that when the outdoor temperature falls to approximately the value desired within the conditioned space the fresh air damper will be maintained at wide open position, this allowing a maximum amount of fresh air to be supplied to the conditioned space. It should also be seen that as the outdoor temperature conditions decrease, the control of the fresh air damper will be shifted from the outdoor temperature controller to the indoor temperature controller this latter controller acting to gradually close the fresh air damper as the inside temperature decreases.

The purpose of the three-gang rheostat 220 is to place additional resistance in series with either the relay coil 217 or the relay coil 218 to thereby prevent complete opening or complete closing of the fresh air damper depending upon the particular adjustment of said rheostat. This is of advantage for at times it is desirable to prevent complete opening of the fresh air damper while at other times it is desirable to prevent complete closing of said damper in order to provide adequate ventilation. Thus by manually adjusting the rheostat 220 the opening movement or closing movement of the fresh air damper may be limited at will.

Operation

With the parts in the position shown the return air temperature is approximately 76° F. as indicated by the control arm 131 of the return air controller 125 assuming mid position. The outside air temperature is approximately 86° F. as indicated by the outdoor controller 136 assuming mid position. Also the relative humidity is approximately 50 percent as indicated by the control arm 152 of the humidity controller contacting the center of its control resistance. For this value of humidity the mercury switch 159 on the humidity controller is tilted so that the right hand contacts are closed. With these conditions, the proportioning motor 97 assumes a position in which the face and by-pass dampers 86 and 87 are in half open position. Also for this outdoor temperature condition the fresh air damper 7 is in half open position. As the return air temperature is above the upper limit of the controller 37 the steam valve 36 is caused to be completely closed, this resulting in the heating coil 30 being out of operation, and the steam valve auxiliary switch formed of blades 54 and 55 being closed. As the relative humidity is above the control point of humidity controller 71 the mercury switch 75 thereof is tilted to open position which causes the water valve 69 to be closed and thus the spray 67 is out of operation. Due to the fact that the face damper 86 is moved away from completely closed position, the auxiliary switch 106 mounted upon the proportioning motor shaft 96 is closed, this causing energization of the relay 28 of the compressor starter by a circuit as follows: line wire 63, wire 80, wire 79, wire 250, switch blade 108, blade 109, wire 251, relay coil 28, wire 252, wire 165, switch blade 55, switch blade 54, wire 166, and wire 82 to line wire 62. This will cause energization of the compressor motor 24 thus placing the refrigeration system into operation for causing cooling and dehumidifying of the air passed over the cooling coil 20.

The return air temperature controller 125 and the humidity controller 150 will therefore co-operate in controlling the face and by-pass dampers in a manner to maintain a constant effective temperature within the conditioned space, the value of effective temperature maintained by said controllers being determined by outside temperature in the manner hereinbefore described. For instance, if the effective temperature within the conditioned space should increase, the controllers 125 and 150 will act to cause a greater amount of air to be passed over the cooling coil 20 and a smaller amount to be by-passed there-around this resulting in increase of cooling and dehumidifying action to counteract the rise in effective temperature.

At this time it will be remembered that the transformer 200 for the fresh air damper controller is energized through the right hand contacts of mercury switch 158 on the humidostat 150. So long as the relative humidity remains below an excessive value, this mercury switch will remain tilted so that its right hand contacts are made. If now should the humidity within the space become excessive due to, for instance, extremely damp weather conditions, the mercury switch 158 will be tilted in the opposite direction, this causing opening of the right hand contacts of said switch and closing the left hand contacts thereof. Opening of the right hand contacts of said mercury switch will cause de-energization of the transformer 200, this resulting in deenergization of holding coil 196 of the proportioning motor 14. As the holding coil 196 will thus no longer act to hold the damper open against the action of the spring 16, said spring will cause closing of the fresh air damper. The closing of the left hand contacts of the mercury switch 159 will establish an energizing circuit for the compressor starter 28 independently of the auxiliary switch 106 on the damper control motor 97, this new circuit being as follows: line wire 63, wire 80, wire 163, mercury switch 159, wire 253, wire 251, relay coil 28, wire 252, wire 165, blade 55, switch blade 54, wire 166 and wire 82 to line wire 62. It should be seen therefore that when the humidity within the conditioned space becomes excessive the fresh air damper will be caused to completely close, and also a separate energizing circuit for the compressor motor will be established. Establishment of this separate compressor energizing circuit will cause operation of the compressor for reducing humidity even though the temperature within the conditioned space may be so low as to cause the return air temperature controller to completely open the by-pass damper 87 and to completely close the face damper 86. Thus for occasional "muggy" weather conditions, in which the temperature is relatively low but the humidity very high, the system will be operated for causing dehumidification of the air to reduce such excessive humidity condition. While in the foregoing specification the face damper 86 has been described as being capable of being moved to a completely closed position, such damper will be designed so as to allow a minimum air flow when closed, instead of shutting off the air flow entirely. Hence even though the face damper 86 may be moved to its closed position, a small volume of air will continue to flow across the cooling coil 20. Due to the inherently slow velocity of this minimum air flow across the cooling coil, the dehumidifying action of the cooling coil on this air will be at a maximum, which is the ideal condition for this phase of operation.

Upon falling outside temperature the control point of the return air temperature controller will be reduced as hereinbefore described. Due however, to the accompanying decrease in cooling load, the face damper 86 will gradually be moved towards closed position and the by-pass damper towards open position. At this same time the outdoor temperature controller 136 in response to this falling temperature will gradually open the fresh air damper 7 thus increasing the amount of fresh air admitted to the conditioned space. Upon continued decrease in outdoor temperature, it will be apparent that the face damper will finally be moved to full closed position, and the by-pass damper to full open position. When this occurs, the auxiliary switch on the damper motor will place the compressor out of operation. At the same time, the fresh air damper will be caused to be wide open by the outdoor controller 136.

If now should the outside temperature continue to decrease, the return air temperature will fall below 71° F. At this time the control of the fresh air damper will be shifted from the outside temperature responsive controller 136 to the return air temperature responsive controller 37.

As the return air temperature falls below 71° F. the controller 37 will act to start opening the steam valve 32 and to start closing the fresh air damper 7. When the steam valve 32 begins to open, the auxiliary switch thereof will open. As this switch is in series with both the relay coil 28 of the compressor starter 25, and with the primary 161 of the transformer 160, opening of the steam valve will cause deenergization of the transformer 160 and will prevent the compressor starter 25 from pulling in. Opening of the steam valve will therefore prevent operation of the refrigeration system. Due to the opening of the steam valve also resulting in deenergizing the transformer 160, the holding coil 102 of the proportioning motor 97 will be deenergized and this will permit the spring 99 to completely open the face damper 86 and to close the by-pass damper 87. Therefore, when the steam valve is open the by-pass damper is closed and all of the air is passed across the heating coil 30. Upon a further increase in heating load due to falling outside temperature, the return air temperature will fall, this causing the controller 37 to simultaneously increase the opening of the steam valve 33 and to decrease the opening of the fresh air damper 7. It should therefore be seen that as the outside temperature decreases, the steam valve is opened further to increase the heating action of the system and the fresh air damper 7 is further closed to restrict the admission of fresh air. It should be observed that as the return air temperature increases, the steam valve will be closed and the fresh air damper opened. Due to this admission of additional fresh air as the return air increases, overheating of the conditioned space due to possible "hunting" of the controller is prevented.

In the event that the humidity within the conditioned space should fall below a predetermined value, for instance 30 percent the humidity controller 71 will act to cause opening of the valve 69 thus supplying water to the spray 67 to cause humidification of the air being passed to the conditioned space.

It should be noted that the energizing current for the proportioning motor 14 which operates the fresh air damper 7 is received from the fan operating circuit. In addition the energizing current for the compressor starter and also the energizing current for the humidity control valve 69 is received from the fan operating circuit. Therefore, when the fan 5 is placed out of operation by opening of the line switch 64, the compressor is prevented from starting, the humidity control valve is prevented from opening and the fresh air damper 7 is moved to closed position. Opening of switch 64 therefore acts to completely place the air conditioning system out of operation.

While I have shown and described a preferred embodiment of my invention, it will be apparent that many modifications thereof which are within the scope of my invention will suggest themselves to those skilled in the art. I therefore wish to be limited only by the scope of the appended claims and the prior art.

I claim as my invention:

1. In an air conditioning system, in combination, a conditioning chamber, means connecting said chamber with a space to be conditioned, heating means in said chamber, cooling means in said chamber, a by-pass around said cooling means, damper means for controlling the relative proportions of the air passed through said cooling means and said by-pass, temperature responsive control means for controlling said damper means to decrease the portion by-passed as the cooling load increases, temperature responsive means for controlling the effect of said heating means, means for supplying a cooling medium to said cooling means, means controlled by said damper control means for controlling said supplying means, and control means actuated upon actuation of said heating means for moving said damper means to substantially an extreme position.

2. In an air conditioning system, in combination, a conditioning chamber, means connecting said chamber with a space to be conditioned, heating means in said chamber, cooling means in said chamber, a by-pass around said cooling means, damper means for controlling the relative proportions of the air passed through said cooling means and said by-pass, temperature responsive control means for controlling said damper means to decrease the portion by-passed as the cooling load increases, temperature responsive means for controlling the effect of said heating means, means for supplying a cooling medium to said cooling means, means actuated with said damper means for controlling said supplying means, and means actuated upon actuation of said heating means for controlling said supplying means in a manner to vary the supply of cooling medium, and for moving said damper means to substantially an extreme position.

3. In an air conditioning system, in combination, a conditioning chamber, means connecting said chamber with a space to be conditioned, heating means in said chamber, cooling means in said chamber, a by-pass around said cooling means, damper means for controlling the relative proportions of the air passed through said cooling means and said by-pass, temperature responsive control means for controlling said damper means to decrease the portion by-passed as the cooling load increases, means responsive to the condition of the air in the space for controlling said cooling means, temperature responsive means for controlling the effect of said heating means, and means for moving said damper means to substantially an extreme position when said heating means is placed in operation.

4. In an air conditioning system, in combination, a conditioning chamber, means connecting said chamber with a space to be conditioned, a first conditioning means in said chamber, a second conditioning means in said chamber, a by-pass around said first conditioning means, damper means for controlling the relative proportions of the air passed through said first conditioning means and said by-pass, means responsive to the condition of the air in said space for controlling both of said conditioning means and said damper means, and means for moving said damper means to an extreme position when said second conditioning means is actuated from an extreme condition of operation.

5. In an air conditioning system, in combination, a conditioning chamber, means connecting said chamber with a space to be conditioned, heating means in said chamber, cooling means in said chamber, a by-pass around said cooling means, damper means for controlling the relative proportions of the air passed through said cooling means and said by-pass, means responsive to the temperature of said space for controlling said damper means, heating means, and cooling means; means responsive to the moisture content of the air in said space additionally controlling said cooling means, and means for moving said damper means to substantially an extreme position when the heating means is placed into operation.

6. In an air conditioning system, in combination, a conditioning chamber, means connecting said chamber with a space to be conditioned, heating means in said chamber, cooling means in said chamber, a by-pass around said cooling means, damper means for controlling the relative proportions of the air passed through said cooling means and said by-pass, means responsive to the temperature of said space for controlling said damper means, heating means, and cooling means; said temperature responsive means acting to place said heating means into operation and to move said damper means to an extreme position when the space temperature falls to a predetermined value, and to place said cooling means into operation when the space temperature rises to a predetermined value; and means responsive to the humidity of said space for placing said cooling means into operation when the humidity exceeds a predetermined value.

7. In an air conditioning system, in combination, a conditioning chamber, means connecting said chamber with a space to be conditioned, heating means in said chamber, cooling means in said chamber, a by-pass around said cooling means, damper means for controlling the relative proportions of the air passed through said cooling means and said by-pass, means responsive to the temperature of said space for controlling said damper means, heating means, and cooling means; humidity responsive means cooperating with said temperature responsive means in controlling the cooling means, said temperature responsive means being arranged to place said heating means into operation and to move the damper means to an extreme position when the space temperature falls to a predetermined value, and said temperature and humidity responsive means being arranged to cause operation of the cooling means when the temperature and humidity conditions in the space are such as to require removal of heat, said temperature responsive means being further arranged to adjust said damper means to decrease the portion of the air by-passed around said cooling means upon rise in temperature after the cooling means is placed into operation.

8. In an air conditioning system, in combination, a conditioning chamber, means connecting said chamber with a space to be conditioned, heating means in said chamber, cooling means in said chamber, a by-pass around said heating and cooling means, damper means controlling the proportions of the air passed through said heating and cooling means and by-passed therearound, and control means for said heating means, said cooling means, and said damper means; said control means being arranged to adjust said damper means to cause substantially all of the air to be passed over said heating and cooling means when the heating means is placed in operation.

9. In an air conditioning system, in combination, a conditioning chamber, means connecting said chamber with a space to be conditioned, heating means in said chamber, cooling means in said chamber, a by-pass around said heating and cooling means, damper means controlling the proportions of the air passed through said heating and cooling means and by-passed therearound, temperature responsive means for controlling said heating means, said cooling means and said damper means; said temperature responsive means acting to place said cooling means into operation when the space temperature exceeds a predetermined maximum and to adjust said damper means in a direction to increase the proportion of the air passed over said heating and cooling means as the space temperature continues to increase, said temperature responsive means acting also to place said heating means into operation when the space temperature lowers to a predetermined minimum, and means for positioning said damper means for causing substantially all of the air to pass over said heating and cooling means when the heating means is placed into operation.

10. In an air conditioning system, in combination, a conditioning chamber having cooling means therein, means connecting said chamber with a space to be conditioned, a fresh air inlet for said chamber, damper means for controlling the flow of fresh air into said chamber, temperature responsive means for controlling said cooling means and said damper means; and humidity responsive means for closing said damper means and operating said cooling means irrespective of the control action of said temperature responsive means whenever the humidity in said space becomes excessive.

11. In an air conditioning system, in combination, a conditioning chamber, means connecting said chamber with a space to be conditioned, a fresh air inlet for said chamber, damper means for controlling the flow of fresh air into said chamber, motor means for positioning said damper means, said motor means being of the type causing closing of said damper means when deenergized, air conditioning means in said chamber, condition responsive means for controlling said damper motor means and said air conditioning means, and humidity responsive means for deenergizing said damper motor means when the humidity exceeds a predetermined value.

12. In an air conditioning system, in combination, a conditioning chamber, means connecting said chamber with a space to be conditioned, means for supplying fresh air to said chamber, means for supplying return air to said chamber, control means for varying the relative amounts of fresh and return air supplied to said chamber, an outside temperature responsive thermostat, an inside temperature influenced thermostat, connecting means between said thermostats and said control means for providing conjoint control of said control means by said thermostats, said outside thermostat being arranged to cause progressive increase in fresh air supply as outside temperature falls from a higher predetermined fixed value to a lower predetermined fixed value, and said inside temperature influenced thermostat being arranged to reduce progressively the fresh air supply as the temperature at said last mentioned thermostat falls from a predetermined fixed higher value to a lower predetermined fixed value irrespective of outside temperature.

13. In an air conditioning system, in combination, a conditioning chamber, means connecting said chamber with a space to be conditioned, means for supplying fresh air to said chamber, means for supplying return air to said chamber, control means for varying the relative amounts of fresh and return air supplied to said chamber, an outside temperature responsive thermostat, an inside temperature influenced thermostat, connecting means between said thermostats and said control means for providing conjoint control of said control means by said thermostats, said outside thermostat having a fixed setting and being associated with said control means in a manner to cause said fresh air supply to be reduced whenever outside temperature rises above said setting, and said inside temperature influenced thermostat being arranged to cause said fresh air supply to be increased when the outside temperature is below the setting of said outside thermostat and the temperature at said inside temperature influenced thermostat increases above a predetermined fixed value.

14. In an air conditioning system, in combination, a conditioning chamber, means connecting said chamber with a space to be conditioned, means for supplying fresh air to said chamber, means for supplying return air to said chamber, control means for varying the relative amounts of fresh and return air supplied to said chamber, an outside temperature responsive thermostat, an inside temperature influenced thermostat, said thermostats each having fixed settings which are independent of each other, connecting means between said thermostats and said control means for providing conjoint control of said control means by said thermostats, said outside thermostat being associated with said control means in a manner to graduatingly vary the fresh air supply in accordance with variations in outside temperature, and said inside temperature influenced thermostat being associated with said control means and said outside thermostat in a manner to supersede the control effect of said outside thermostat and to cause said control means to reduce the fresh air supply to a minimum whenever the temperature at said inside temperature influenced thermostat falls below its setting irrespective of the value of outside temperature.

15. In an air conditioning system, in combination, a conditioning chamber, means connecting said chamber with a space to be conditioned, means for supplying fresh air to said chamber, means for supplying return air to said chamber, control means for varying the relative amounts of fresh and return air supplied to said chamber, an outside temperature responsive thermostat, an inside temperature influenced thermostat, said thermostats having fixed settings which are independent of each other, connecting means between said thermostats and said control means for providing conjoint control of said control means by said thermostats, said thermostats being associated with said control means in a manner to cause reduction of the fresh air supply to a minimum when either the outside temperature rises above the setting of the outside thermostat, or the temperature at said inside temperature influenced thermostat falls below the setting thereof.

16. In an air conditioning system, in combination, a conditioning chamber, means connecting said chamber with a space to be conditioned, means for supplying fresh air to said chamber, a controller for varying the supply of fresh air, motor means for actuating said controller, a thermostat influenced by inside temperature for graduatingly controlling said motor means in accordance with changes in temperature at said thermostat, a thermostat responsive to outdoor temperature, said thermostats having fixed sittings which are independent of each other, and connections between said thermostats and said motor means, said connections being arranged in a manner to cause said outdoor thermostat to place said inside temperature influenced thermostat in control of said motor means when outside temperature is below the setting of said outdoor thermostat, while at least partially placing said inside temperature influenced thermostat out of control of said motor means and causing said motor means to drive said fresh air supply controller to a predetermined position when the outside temperature rises above the setting of said outside thermostat.

17. In an air conditioning system, in combination, a conditioning chamber, means connecting said chamber with a space to be conditioned, heating means in said chamber, cooling means in said chamber, a by-pass around said cooling means, damper means for controlling the relative proportions of the air passed through said cooling means and said by-pass, means for supplying fresh air to said conditioning chamber, fresh air damper means for controlling the fresh air supply, an outside temperature influenced thermostat, an inside temperature influenced thermostat, said thermostats being arranged to control said fresh air damper means in a manner to cause said fresh air supply to be reduced upon increase in outside temperature to a predetermined value, and to cause said fresh air supply to be increased when outside temperature is below said predetermined value and the temperature at said inside temperature influenced thermostat increases above a predetermined value, said outside temperature influenced thermostat also being arranged to control said first damper means, and said inside temperature influenced thermostat being arranged to control said heating means, to run said first damper means to an extreme position, and to place said cooling means out of operation when the temperature at said inside temperature influenced thermostat falls to a predetermined value.

18. In an air conditioning system, in combination, a conditioning chamber, means connecting said chamber with a space to be conditioned, heating means in said chamber, cooling means in said chamber, a by-pass around said cooling means, damper means for controlling the relative proportions of the air passed through said cooling means and said by-pass, means for supplying fresh air to said conditioning chamber, fresh air damper means for controlling the fresh air supply, an outside temperature influenced thermostat, an inside temperature influenced thermostat, said thermostats being arranged to control said fresh air damper means in a manner to cause said fresh air supply to be reduced upon increase in outside temperature to a predetermined value, and to cause said fresh air supply to be increased when outside temperature is below said predetermined value and the temperature at said inside temperature influenced thermostat increases above a predetermined value, said outside temperature influenced thermostat also being arranged to control said first damper means and said cooling means, means responsive to the space relative humidity for placing said cooling means into operation and closing said fresh air damper means when the space relative humidity becomes excessive, and means for placing said inside temperature influenced thermostat in control of said heating means, for running said first damper means to an extreme position, and for placing the cooling means out of operation when the temperature at said indoor temperature influenced thermostat falls below a predetermined value.

19. In an air conditioning system, in combination, a conditioning chamber, means connecting said chamber with a space to be conditioned, cooling means in said chamber, means for supplying cooling medium to said cooling means, a by-pass around said cooling means, flow control means for controlling the relative proportions passed through the cooling means and through said by-pass, actuating means for said flow control means, condition responsive control means for controlling said actuating means in a manner to decrease the portion by-passed as the load upon the system increases, and means actuated by said flow control actuating means for placing said cooling medium supplying means out of operation when the load upon the system decreases to a predetermined value.

20. In an air conditioning system, in combination, a conditioning chamber, means for connecting said chamber with a space to be conditioned, cooling and dehumidifying means in said chamber, a by-pass around said cooling and dehumidifying means, damper means for controlling the relative proportions of air passed through said by-pass and through said cooling and dehumidifying means, actuating means for said damper means, means responsive to the air conditioning load for controlling said damper actuating means, means actuated by said actuating means for placing said cooling and dehumidifying means into operation when the damper means is shifted to a predetermined position, and means responsive to excessive relative humidity for placing said cooling and dehumidifying means into operation irrespective of the position of said damper means.

21. In an air conditioning system, in combination, a conditioning chamber, means for connecting said chamber with a space to be conditioned, condition changing means in said chamber, a by-pass around said condition changing means, damper means for controlling the relative proportions of the air passed through said condition changing means and through said by-pass, electric motor means for actuating said damper means, said motor means being of the type which moves in one direction under its own power and which is driven in the opposite direction by an external returning force, said motor means also having a control circuit, a first controller connected into said control circuit for controlling the position assumed by said motor means, and a second controller for interrupting the power supply to said motor means.

22. In an air conditioning system, in combination, a conditioning chamber connected to a space to be conditioned, condition changing means in said chamber comprising a heating means and cooling means, a by-pass around one of said means, damper means for varying the flow of air through said by-pass, a first condition responsive means for controlling said heating means, in a manner to increase the heating effect upon increase in demand for heat, a second condition responsive means for controlling said cooling means, in a manner to place said cooling means in operation upon demand for operation thereof, each of said condition responsive means also controlling said damper means.

23. In an air conditioning system, in combination, a conditioning chamber connected to a space to be conditioned, a cooling coil in said conditioning chamber, a by-pass for the air around said cooling coil, damper means for controlling the relative proportions of the air passed through said cooling means and said by-pass, temperature responsive means responding to a temperature which is a measure of the space cooling load for controlling said damper means in a manner to increase the flow of air through said coil upon increase in cooling load while decreasing the flow of air through said coil upon decrease in cooling load, means actuated upon either a demand for cooling or a demand for dehumidification for placing said cooling coil into operation, humidifying means for humidifying the air discharged from said cooling coil, and means actuated upon decrease in humidity of the air to a predetermined low value for placing said humidifier into operation.

24. In an air conditioning system, in combination, a conditioning chamber, means connecting said chamber with a space being conditioned, means for supplying fresh air to said chamber, means for supplying return air to said chamber, flow control means for controlling the relative volumes of fresh and return air supplied to said chamber, motor means for adjusting said flow control means, said motor means having control line means, an inside temperature influenced thermostat connected into said control line means for graduatingly varying the flow of fresh air in accordance with changes at said thermostat, an outside thermostat having a fixed setting which is independent of said inside temperature influenced thermostat, said outside thermostat being connected into said control line means in a manner to place said inside temperature influenced thermostat in control of said motor means when outside temperature is below the setting of said outside thermostat, while operating said motor means in a manner to reduce the flow of fresh air to a minimum when outside temperature rises above said setting.

25. In an air conditioning system, in combination, a conditioning chamber, means connecting said chamber with a space being conditioned, means for supplying fresh air to said chamber, means for supplying return air to said chamber, flow control means for controlling the relative volumes of fresh and return air supplied to said chamber, a reversible electric motor for adjusting said flow control means, said motor having a three wire control circuit, said three wire control circuit including a common wire, a first control wire which is adapted in cooperation with said common wire to cause said motor to operate in one direction, and a second control wire which is adapted in cooperation with said common wire to cause said motor to operate in the opposite direction, a first thermostatic current controller influenced by inside temperature and connected into said control circuit in a manner to cause said motor to graduatingly reduce the flow of fresh air upon fall in temperature, and a second thermostatic current controller responding to outside temperature and connected into said control circuit in a manner to reduce the flow of fresh air to a predetermined minimum irrespective of said first thermostatic current controller whenever outside temperature rises above the setting of said second thermostatic current controller while placing said first thermostatic current controller in control of said motor when outside temperature falls below the setting of said second thermostatic current controller.

26. In an air conditioning system, in combination, a conditioning chamber, means connecting said chamber with a space being conditioned, means for supplying fresh air to said chamber, means for supplying return air to said chamber, flow control means for controlling the relative volumes of fresh and return air supplied to said chamber, motor means for adjusting said flow control means, said motor means having control line means, an outside temperature influenced thermostat connected into said control line means for graduatingly controlling said motor means for graduatingly varying the flow of fresh air in accordance with changes in outside temperature, a space temperature responsive thermostat also connected into said control line means for controlling said motor means, said last mentioned thermostat having a fixed setting which is independent of said first mentioned thermostat and acting upon temperature rise above said setting to place the first mentioned thermostat in control of said motor means, while causing movement of the motor means for reducing the flow of fresh air to a predetermined minimum when the space temperature rises above said setting.

27. In an air conditioning system, in combination, a conditioning chamber, means connecting said chamber with a space being conditioned, means for supplying fresh air to said chamber, means for supplying return air to said chamber, flow control means for controlling the relative volumes of fresh and return air supplied to said chamber, a reversible electric motor for adjusting said flow control means, said motor having a three wire control circuit, said three wire control circuit including a common wire, a first control wire which is adapted in cooperation with said common wire to cause said motor to operate in one direction, and a second control wire which is adapted in cooperation with said common wire to cause said motor to operate in the opposite direction, a first thermostatic current controller influenced by outside temperature and connected into said control circuit in a manner to cause said motor to graduatingly vary the flow of fresh air in accordance with its temperature, and a second current controller actuated in accordance with space temperature and connected into said control circuit in a manner to place said first current controller in control of said motor when space temperature is above a predetermined value, while causing movement of said motor for reducing the fresh air flow to a minimum when space temperature falls below a predetermined value.

JOHN E. HAINES.